Sept. 24, 1940.   B. A. SWENNES   2,215,671
VARIABLE TRANSMISSION
Filed Oct. 28, 1938
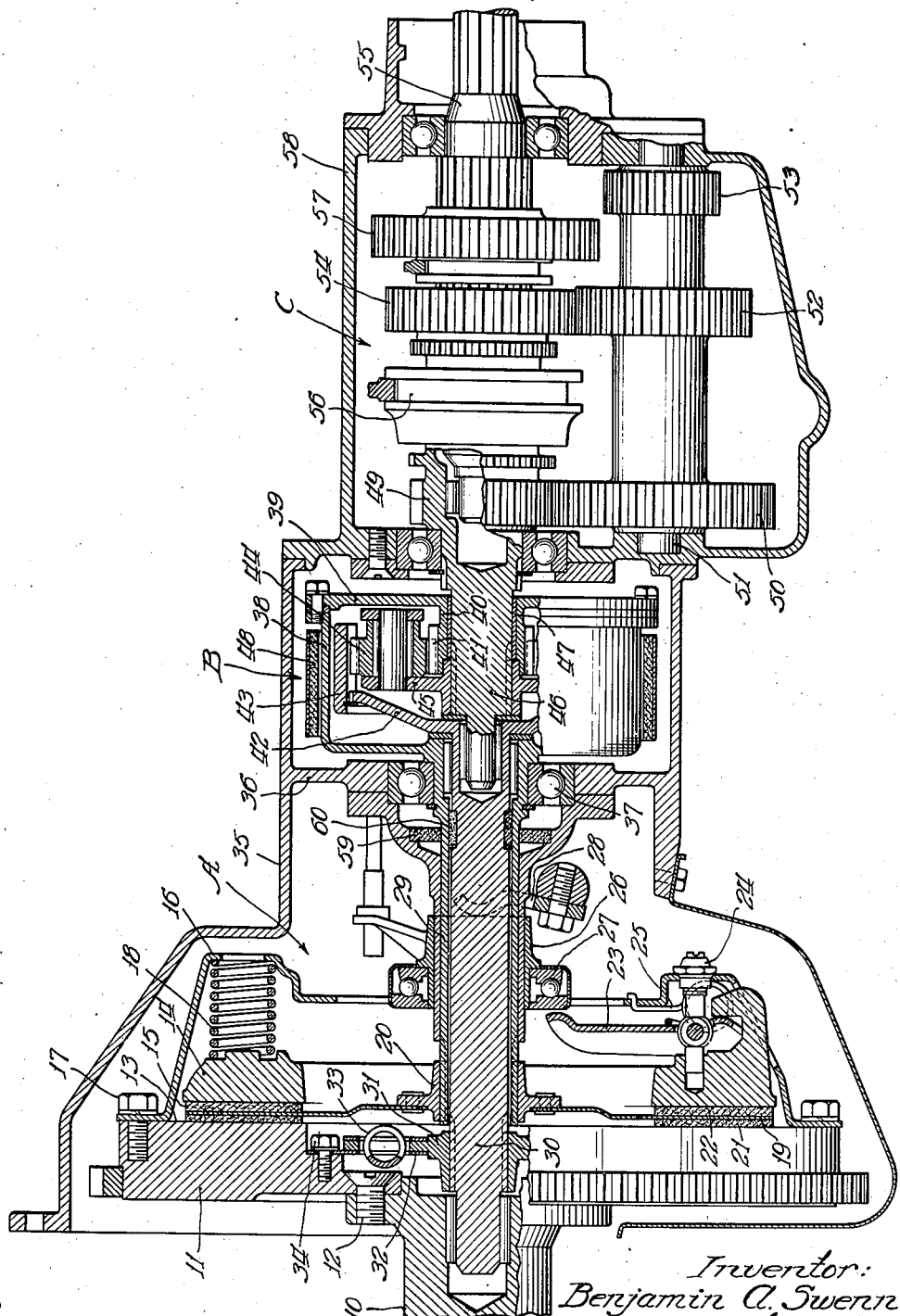
Inventor:
Benjamin A. Swennes
By Edward C. Gritzbaugh
Atty.

Patented Sept. 24, 1940

2,215,671

UNITED STATES PATENT OFFICE 2,215,671

VARIABLE TRANSMISSION

Benjamin A. Swennes, Rockford, Ill., assignor to Borg-Warner Corporation, Chicago, Ill., a corporation of Illinois Application October 28, 1938, Serial No. 237,388

2 Claims. (Cl. 74—290)

This invention relates to variable transmissions of the stepped type.

The object of this invention is to provide a variable transmission having a plurality of forward speeds which is simple and yet which employs standard parts or parts which have been tried and found to be commercially successful.

Another object of this invention is to provide a transmission which will give four speeds forward and neutral with a minimum number of controls.

Another object of this invention is to provide a torsional vibration dampener for a multi-speed transmission which will be effective for all speeds.

Still another object of this invention is to provide a planetary gear set for a transmission wherein one element of the planetary is non-releasably connected to the source of power, another element is non-releasably connected to a driven shaft, and wherein nevertheless a neutral condition may be obtained.

These and other objects and features of this invention will become apparent from the following description when taken together with the accompanying drawing, the single figure of which is an elevation in cross-section of a transmission embodying said objects and features.

In general, the preferred embodiment of this invention may be said to comprise a two-speed planetary gear set in series with a two-speed countershaft type transmission so that four forward speeds are available. The sun gear of the planetary is connected to the driving shaft through a conventional clutch, and is provided in addition with a drum and brake band by which it may be held against rotation. The ring gear is non-releasably connected to the driving shaft. The carrier of the planetary gear set is connected to an intermediate shaft which constitutes the input to the countershaft transmission. A conventional synchronizer is used between the geared ratio and the direct connection in the countershaft transmission. A conventional sliding gear is also provided in the countershaft transmission for selectively connecting the transmission for reverse and neutral or forward operation. Since the ring gear of the planetary is continuously connected to the driving shaft, the torsional vibration dampener is inserted between the ring gear and driving shaft, so that no matter what speed is effective, the torsional vibration dampener will act or re-act to prevent the transmission of vibrations to the driven shaft.

Referring now to the drawing for a detailed description of the invention, the transmission may be divided roughly into three sections, A, B and C. Section A includes the bell housing and the fly-wheel, clutch, clutch-actuating means, shafts, etc., enclosed thereby. Section B includes the planetary transmission and the housing therefor, and section C includes the countershaft transmission.

In section A, 10 is a driving shaft to which is secured a fly-wheel 11, preferably by means of bolts 12. Considering drive shaft 10 as being at the forward end of the transmission, the rear face 13 of fly-wheel 11 is machined to constitute it one element of a friction clutch. Adjacent said face 13 is a pressure plate 14, having a machined surface 15 thereon in opposed relation to surface 13 and constituting another element of said clutch. A housing 16 covers pressure plate 14, and is bolted to fly-wheel 11 by means of bolts 17. Between housing 16 and pressure plate 14 are a number of springs 18 which urge pressure plate 14 against the fly-wheel.

Between surfaces 13 and 15 is a disc 19 which is riveted to a collar 20. Disc 19 is provided with friction facings 21 and 22 which are adapted to cooperate with surfaces 13 and 15, respectively, and constitute the driven elements of the friction clutch. Conventional throw-out fingers 23, pins 24 and biasing springs 25 between pressure plate 14 and housing 16 serve to withdraw pressure plate 14 against the action of springs 18. A collar 26 provided with a ball-bearing 27 is axially slidable by the action of clutch lever 28 to engage throw-out fingers 23. Thus, disc 19 is normally in driving relation with fly-wheel 11 and is disengaged by rocking lever 28 in a counter-clockwise direction.

Also included in section A is a hollow shaft 29 to which collar 20 of clutch disc 19 is slidably splined, and shaft 30, the forward end of which is slidably splined to collar 31, which in turn is connected to an annulus 32 through tangentially acting helical springs 33. Annulus 32 is rigidly connected to fly-wheel 11 with bolts 34.

It will be apparent thus far that hollow shaft 29 is releasably connected to drive shaft 10 through the disc clutch, and that shaft 30 is non-releasably connected to the driving shaft through a tangentially-acting helical spring. It will also be apparent that such spring will act to absorb torsional vibrations between driving shaft 10 and shaft 30.

Surrounding section A is a bell-housing 35 which extends rearwardly to enclose section B.

Bell-housing 35 is provided, however, with a partition 36 at the forward end thereof, the central portion of said partition being apertured to retain ball-bearings 37, which in turn support the rearward end of hollow shaft 29. Said hollow shaft 29 and shaft 30 extend into section B, and are connected to the planetary transmission enclosed therein in the manner now to be described.

The rearward end of shaft 29 is integral with a drum 38 to which is bolted a disc 39. Said disc 39 is integral with a sleeve 40 having teeth constituting a sun-gear 41. Said sun-gear, it will be noted, is enclosed by drum 38 and disc 39. The rearward end of shaft 30 is provided with a peripherally toothed flange 42 upon which is mounted internally toothed ring gear 43, the teeth of gear 43 cooperating with the toothed periphery of flange 42 so as to be driven by the latter. Meshing with the ring gear 43 and sun gear 41 are a plurality of planet gears 44, which are mounted on a carrier 45. Said carrier 45 is splined to an intermediate shaft 46, so that carrier 45 and intermediate shaft 46 always rotate together. Intermediate shaft 46 serves to support sun-gear 41 through a bushing 47.

The outer periphery of drum 38 is machined and is surrounded with a brake band 48, which is adapted to cooperate with the machined outer surface to restrain sun-gear 41 against rotation.

Intermediate shaft 46 extends into section C, and has an enlarged rearward end which is toothed to form a gear 49. Said gear 49 cooperates with gear 50 on countershaft 51, gear 50 being the first gear of cluster 50, 52 and 53. Cooperating with gear 52 is a gear 54, which is coaxial with gear 49. Gear 54 is mounted on driven shaft 55, which is piloted in shaft 46 and extends through the rear of section C. A conventional synchronizer 56 may be used selectively to connect shaft 46 and gear 54 to driven shaft 55. A gear 57 is slidably splined on shaft 55 and is adapted to mesh with an idler (not shown) which in turn meshes with gear 53 on countershaft 51 to provide a conventional reverse drive. When it is desired to obtain neutral or forward drive, gear 57 is slid forwardly out of contact with the idler.

It is understood that the forward end of shaft 30 may be piloted in shaft 10 and similarly the forward end of intermediate shaft 46 may be piloted in the rear of shaft 30 in accordance with well-known design practice. Section C is provided with a housing 58 and the various shafts are mounted in said housing by means of suitable bearings. Oil seals 59 and 60 are provided between sections A and B to prevent the oil in the transmission from entering section A and adversely affecting the operation of the friction clutch located therein.

The operation of the transmission is as follows:

For first speed, clutch disc 19 is released and brake band 48 is applied to arrest the rotation of sun-gear 41. Synchronizer 56 is actuated to connect gear 54 to driven shaft 55, and gear 57 is in its neutral position. The drive is then from shaft 10 through the torsional vibration dampener, shaft 30, ring gear 43, planetary gears 44, planetary gear carrier 45, intermediate shaft 46, gears 49, 50, 52 and 54 to driven shaft 55, thus utilizing the speed reduction and torque multiplication available in both the planetary gear set and the countershaft transmission.

Second speed is obtained by releasing brake band 48 and engaging friction disc 19 so as to cause sun-gear 41 to be driven by drive shaft 10. Since ring gear 43 is non-releasably connected to driving gear 10, said ring gear 43 is likewise driven by drive shaft 10 and will therefore rotate at the same speed as drive shaft 10. The planetary gear set is therefore locked in one-to-one relation and intermediate shaft 46 rotates at the same speed as drive shaft 10. Synchronizer 56, however, remains operated to connect gear 54 with driven shaft 55 to obtain a reduction through the countershaft gear set. For second speed, therefore, the drive is from driving shaft 10 through two paths of power flow, one including torsional vibration dampener spring 33, shaft 30 and ring gear 43 and the other including clutch disc 19, hollow shaft 29 and sun-gear 41, with planetary gears 44 common to both paths. From planetary gears 44 the drive is through carrier 45, shaft 46, gears 49, 50, 52 and 54, synchronizer 56 to driven shaft 55.

For third speed the planetary operates as for first speed, but synchronizer 56 is operated to couple shafts 46 and 55 directly. In third speed, therefore, the drive is from drive shaft 10 through torsional vibration dampener spring 33, shaft 30, spring gear 43, planet pinion 44, planet carrier 45 and shaft 46, through synchronizer 56 to driven shaft 55.

Fourth speed is obtained by engaging clutch disc 19 and disengaging brake band 48 as for second speed, synchronizer 56 remaining in position to couple shafts 46 and 55 directly. The drive is then a direct drive between drive shaft 10 and driven shaft 55, since the planetary gear set is again locked in one-to-one relation.

Neutral may be obtained in either one of two ways. The first is by setting synchronizer 56 in its intermediate position, that is, in the position wherein it is not coupled with either gear 54 or shaft 46. When the synchronzer is so set, regardless of the connections to the planetary, no drive can be transmitted to the driven shaft 55. Neutral may also be obtained, however, by releasing brake band 48 and clutch disc 19. With these two elements released, the only member connected to the driving shaft is shaft 30, and this member will rotate planet gears 44 about their axes to drive sun-gear 41 reversely, all the torque being dissipated in the rotation of said sun-gear 41 and the mechanism associated therewith. Thus, no torque is transmitted to carrier 45 and its associated shaft 46, and therefore, regardless of the setting of synchronizer 56, no torque will be transmitted to driven shaft 55.

Two speeds in reverse may be obtained through the transmission described. For both speeds in reverse, the synchronizer 56 must be in its neutral position and gear 57 must be in mesh with the reverse idler. The first speed is obtained by releasing clutch disc 19 and braking sun-gear 41 to obtain a reduction through the planetary gear set, and the second speed in reverse is obtained by releasing sun-gear 45 and driving it from the drive shaft through clutch disc 19, that is, by locking the planetary in one-to-one ratio.

It will be observed that all forward speeds must be transmitted through the planetary gear set. If the sun-gear is braked to obtain a reduction through the gear set, then the drive is through shaft 30 and the torsional vibration dampening spring 33. If the planetary is locked in one-to-one, then the drive may be said to be through the sun-gear 41 and planet pinions 44 which react against ring gear 43. Any torsional vibrations, therefore, that are transmitted through clutch disc 19 to sun-gear 41 are absorbed in torsional vibration dampener 33 despite the fact that said ring gear 43 is simultaneously being driven from the driving shaft through the same vibration dampening medium. It is obvious, therefore, that springs 33 are so located that irrespective of the condition of the gears in sections B and C, said springs will be effective to dampen torsional vibrations between drive shafts 10 and driven shafts 55. Although the vibration absorbing means shown is a helical spring, I wish it to be clearly understood that the invention is not limited to such springs but includes any coupling member capable of dampening torsional vibrations.

It will also be apparent that the construction of the friction clutch, the planetary gear set, the counter-shaft and reverse, and also the synchronizer 56 is conventional, well known and represents commercially successful designs.

It is understood that the foregoing is merely illustrative of a preferred embodiment of the invention, and that the invention, therefore, is not to be limited thereto, but is to be determined by the appended claims.

I claim:

1. A transmission mechanism comprising a driving shaft, a driven shaft, and planetary gearing between said driving and driven shafts, said gearing comprising a ring gear non-releasably connected to said driving shaft, a sun-gear releasably connected to said driving shaft, a plurality of planet gears meshing with said ring and sun-gears, and a planet carrier connected to said driven shaft, means for restraining said sun-gear against rotation when released from the driving shaft, whereby to permit the driven shaft to be driven from said ring gear, said sun and ring gears being adapted to be driven simultaneously to drive said planet gears through two paths, and means between the driving and driven shafts and effective either when said planet gears are driven through two paths or when driven through a single path to absorb torsional vibrations between said shafts.

2. A transmission mechanism as described in claim 1, said torsional vibration absorbing means being connected between the driving shaft and the ring gear.

BENJAMIN A. SWENNES.